(12) United States Patent
Calzada et al.

(10) Patent No.: US 7,901,723 B2
(45) Date of Patent: Mar. 8, 2011

(54) FOOD TRAY

(75) Inventors: Manuel Calzada, Rolling Meadows, IL (US); James C. Purgatorio, Woodridge, IL (US); Michael Theodos, Bossier City, LA (US)

(73) Assignee: Restaurant Technology, Inc., Oak Brook, IL (US)

( * ) Notice: Subject to any disclaimer, the term of this patent is extended or adjusted under 35 U.S.C. 154(b) by 1260 days.

(21) Appl. No.: 10/930,174

(22) Filed: Aug. 31, 2004

(65) Prior Publication Data

US 2006/0045943 A1     Mar. 2, 2006

(51) Int. Cl.
*A47J 39/02*     (2006.01)
*A23L 3/02*     (2006.01)
*B65D 25/28*     (2006.01)
*B65D 21/02*     (2006.01)

(52) U.S. Cl. ...... 426/523; 426/520; 426/407; 220/23.89; 220/23.88; 312/333; 206/1.5

(58) Field of Classification Search ............. 312/249.11, 312/404, 410, 246, 330.1, 351, 283, 194, 312/198, 211, 313; 206/503, 509, 510, 1.5, 206/499, 565, 526, 511, 512; 211/126; 99/483; 426/394, 521, 407, 403, 520, 523

See application file for complete search history.

(56) References Cited

U.S. PATENT DOCUMENTS

| | | | | |
|---|---|---|---|---|
| 893,983 A * | 7/1908 | Chilstrom | | 206/232 |
| 1,143,443 A * | 6/1915 | Schramm | | 312/246 |
| 1,363,687 A * | 12/1920 | Sorg | | 312/286 |
| 1,432,559 A * | 10/1922 | Jamieson | | 312/9.48 |
| 1,453,121 A * | 4/1923 | Benner | | 312/286 |
| 1,464,934 A * | 8/1923 | Hoadley | | 312/286 |
| 1,606,178 A * | 11/1926 | Rand, Jr. et al. | | 312/219 |
| 1,684,889 A * | 9/1928 | Russ | | 312/286 |
| 1,736,108 A * | 11/1929 | Bullen et al. | | 312/286 |
| 1,837,924 A * | 12/1931 | Rutherford | | 99/352 |
| 1,841,330 A * | 1/1932 | Victor | | 312/323 |
| 2,073,171 A * | 3/1937 | Pittroff | | 312/246 |
| 2,295,747 A * | 9/1942 | Mills | | 220/351 |
| 2,565,784 A * | 8/1951 | Sheean | | 312/286 |
| 2,730,423 A * | 1/1956 | Mock | | 312/334.22 |
| 2,914,370 A * | 11/1959 | Hensch et al. | | 312/286 |
| 3,245,581 A * | 4/1966 | Reach | | 221/150 A |
| 3,259,447 A * | 7/1966 | Deutsch | | 312/334.46 |

(Continued)

OTHER PUBLICATIONS

Definition of "extent" Websters New World Dictionary, Third College Edition, 1988, p. 481.*

*Primary Examiner* — Steven L Weinstein
*Assistant Examiner* — Viren Thakur
(74) *Attorney, Agent, or Firm* — Ryndak & Suri LLP

(57) ABSTRACT

A food tray adapted to be removably located in a predetermined position in a compartment is provided having a tray body and a fixed movable stop member. The tray body includes a first end and a second end, a bottom and a sidewall structure defining a volume. The fixed movable stop member is located at one end of the tray body and is movable between a retracted position and an extended position. When the tray is inserted in the compartment in the predetermined position, the fixed movable stop member is in the extended position and restrains further insertion of the tray into the compartment. A method of making a food tray in accordance with the invention is provided. Also provided is a method of storing food within a food tray to be contained in a pass-through compartment.

21 Claims, 4 Drawing Sheets

U.S. PATENT DOCUMENTS

| | | | | |
|---|---|---|---|---|
| 3,385,643 A * | 5/1968 | Adell | | 312/330.1 |
| 3,397,001 A * | 8/1968 | Friedman | | 292/87 |
| 3,465,897 A * | 9/1969 | Horn et al. | | 211/151 |
| 3,604,582 A * | 9/1971 | Boudin et al. | | 215/202 |
| 3,782,800 A * | 1/1974 | Remington et al. | | 312/333 |
| 3,868,123 A * | 2/1975 | Berg et al. | | 280/79.2 |
| 4,005,745 A * | 2/1977 | Colato et al. | | 165/61 |
| 4,016,972 A * | 4/1977 | Szamborski | | 206/6.1 |
| 4,019,022 A * | 4/1977 | Seider et al. | | 219/386 |
| 4,076,117 A * | 2/1978 | Wisdom et al. | | 206/106 |
| 4,106,239 A * | 8/1978 | Bancroft et al. | | 49/449 |
| 4,120,400 A * | 10/1978 | Kotyuk | | 206/528 |
| 4,178,049 A * | 12/1979 | Loo | | 312/286 |
| 4,183,596 A * | 1/1980 | Greene et al. | | 312/333 |
| 4,191,436 A * | 3/1980 | Cherry | | 312/334.11 |
| 4,235,282 A * | 11/1980 | de Filippis et al. | | 165/61 |
| 4,254,824 A * | 3/1981 | Springer | | 165/64 |
| 4,284,204 A * | 8/1981 | Carey, Jr. | | 220/345.3 |
| 4,401,350 A * | 8/1983 | Fortune | | 312/107 |
| 4,534,469 A * | 8/1985 | Elsmo | | 206/560 |
| 4,561,544 A * | 12/1985 | Reeve | | 206/540 |
| 4,600,143 A * | 7/1986 | Harlow et al. | | 232/17 |
| 4,730,731 A * | 3/1988 | Allison | | 206/540 |
| 4,736,689 A * | 4/1988 | Stanko | | 108/5 |
| 4,889,238 A * | 12/1989 | Batchelor | | 206/535 |
| 4,913,296 A * | 4/1990 | Cournoyer et al. | | 211/41.12 |
| 4,987,999 A * | 1/1991 | Hehn | | 206/387.1 |
| 5,033,634 A * | 7/1991 | Batchelor et al. | | 220/281 |
| 5,082,137 A * | 1/1992 | Weinstein | | 220/345.3 |
| 5,275,291 A * | 1/1994 | Sledge | | 206/531 |
| 5,281,021 A * | 1/1994 | Rock et al. | | 312/334.32 |
| 5,292,191 A * | 3/1994 | Slivon | | 312/332.1 |
| 5,340,340 A * | 8/1994 | Hastings et al. | | 439/64 |
| 5,349,723 A * | 9/1994 | Domenig | | 16/94 R |
| 5,454,932 A * | 10/1995 | Tardif et al. | | 206/387.1 |
| 5,497,893 A * | 3/1996 | Mangone, Jr. | | 220/3.8 |
| 5,645,304 A * | 7/1997 | Richardson et al. | | 292/1 |
| 5,671,856 A * | 9/1997 | Lisch | | 220/4.27 |
| 5,783,803 A * | 7/1998 | Robards, Jr. | | 219/392 |
| 5,819,927 A * | 10/1998 | Yeh | | 206/308.1 |
| 5,843,595 A * | 12/1998 | Kawakatsu | | 429/97 |
| 5,932,845 A * | 8/1999 | Lacy | | 174/67 |
| 6,086,176 A * | 7/2000 | Aoyama | | 312/286 |
| 6,105,784 A * | 8/2000 | Salminen et al. | | 206/775 |
| 6,210,638 B1 * | 4/2001 | Grieco et al. | | 422/22 |
| 6,288,902 B1 * | 9/2001 | Kim et al. | | 361/725 |
| 6,296,175 B1 * | 10/2001 | Dixon | | 229/102 |
| 6,341,710 B1 * | 1/2002 | Danielson et al. | | 220/281 |
| 6,431,616 B1 * | 8/2002 | Julian | | 292/171 |
| 6,510,960 B1 * | 1/2003 | Christopherson et al. | | 220/345.3 |
| 6,547,289 B1 * | 4/2003 | Greenheck et al. | | 292/126 |
| 6,607,766 B2 | 8/2003 | Ewald et al. | | |
| 6,655,763 B2 * | 12/2003 | Judge et al. | | 312/334.46 |
| 6,902,245 B1 * | 6/2005 | Hoeppner | | 312/334.46 |
| 7,044,569 B1 * | 5/2006 | Relyea et al. | | 312/249.11 |
| 7,108,340 B2 * | 9/2006 | Lai | | 312/334.46 |
| 7,121,638 B1 * | 10/2006 | Eggert et al. | | 312/332.1 |
| RE40,267 E * | 4/2008 | Mehmen | | 292/128 |
| 7,364,244 B2 * | 4/2008 | Sandoval | | 312/333 |
| 2002/0081887 A1 * | 6/2002 | Judge et al. | | 439/348 |
| 2002/0100756 A1 * | 8/2002 | Veltrop | | 220/200 |
| 2003/0025425 A1 * | 2/2003 | Cheng | | 312/218 |
| 2003/0132687 A1 * | 7/2003 | Morris et al. | | 312/333 |
| 2005/0092763 A1 * | 5/2005 | Haggerty et al. | | 220/912 |
| 2005/0218760 A1 * | 10/2005 | Cheng | | 312/333 |
| 2005/0264145 A1 * | 12/2005 | Croft et al. | | 312/330.1 |

* cited by examiner

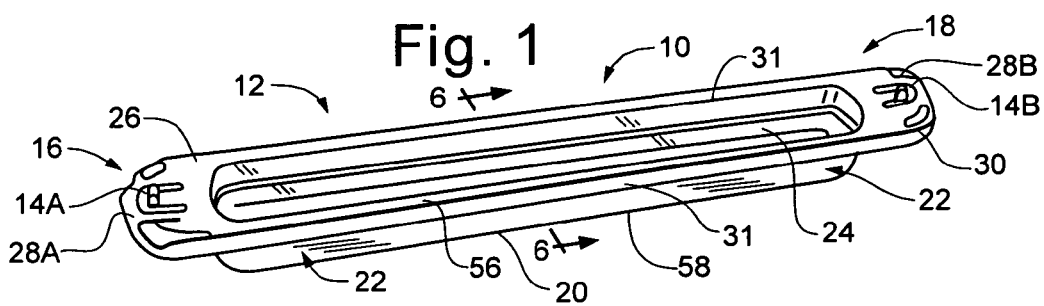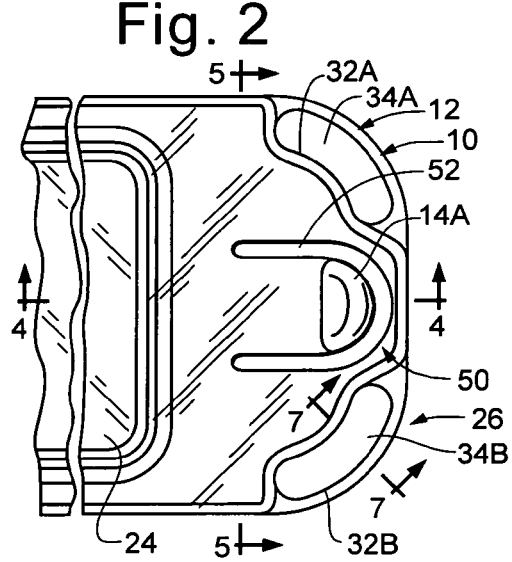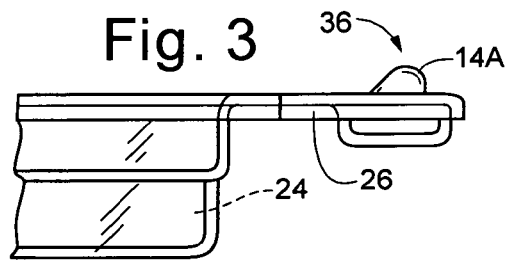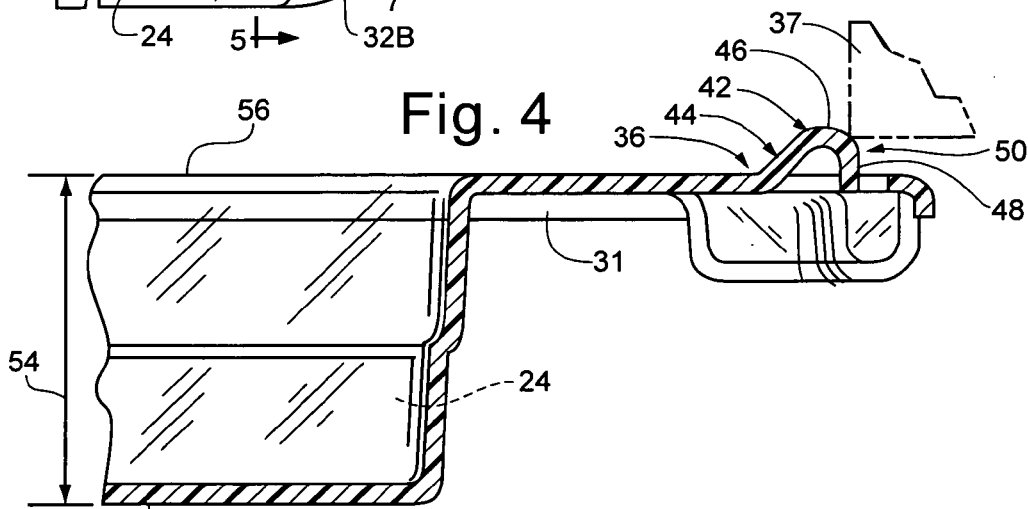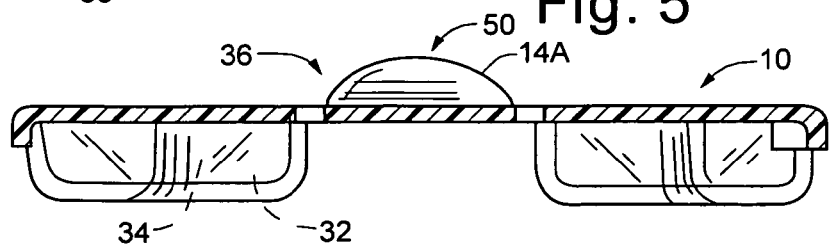

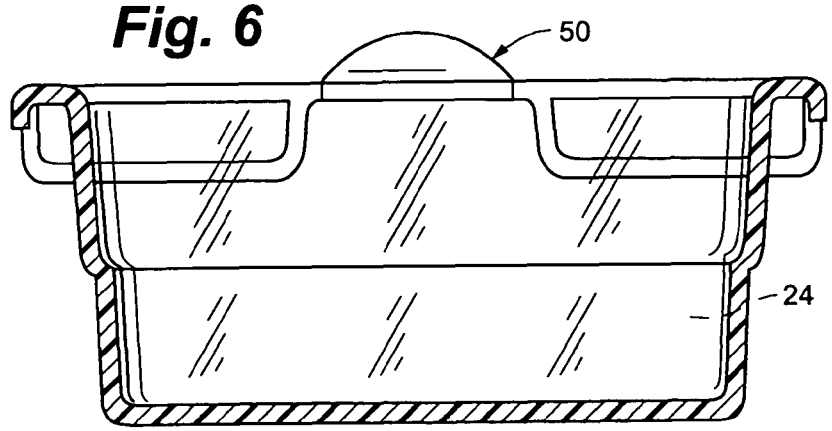
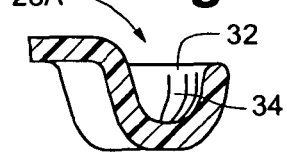
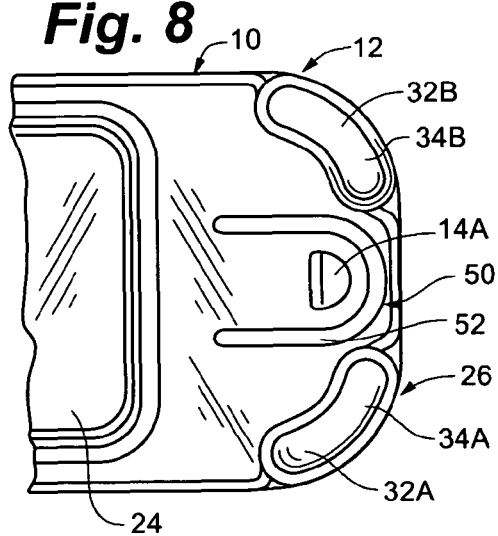
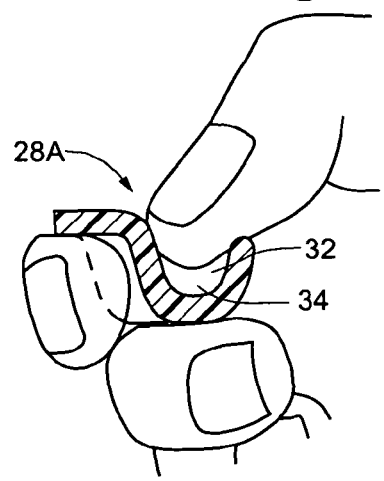
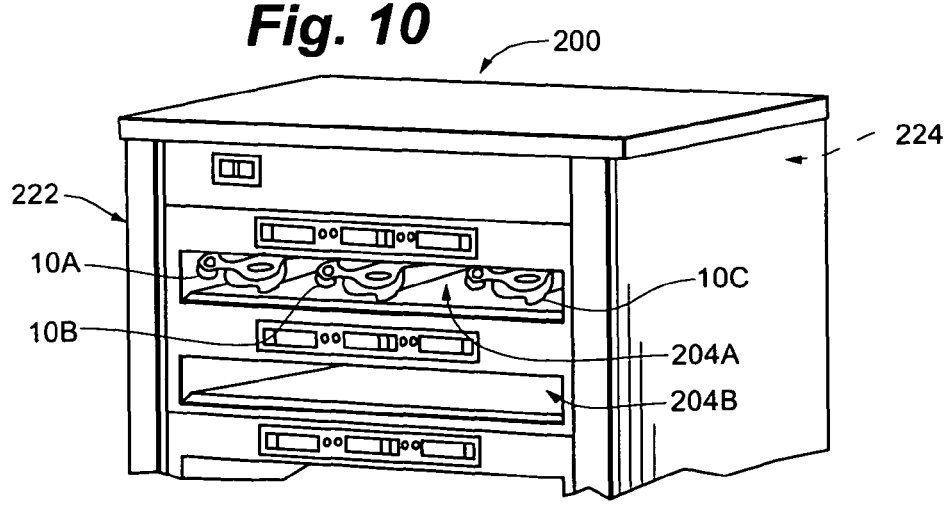

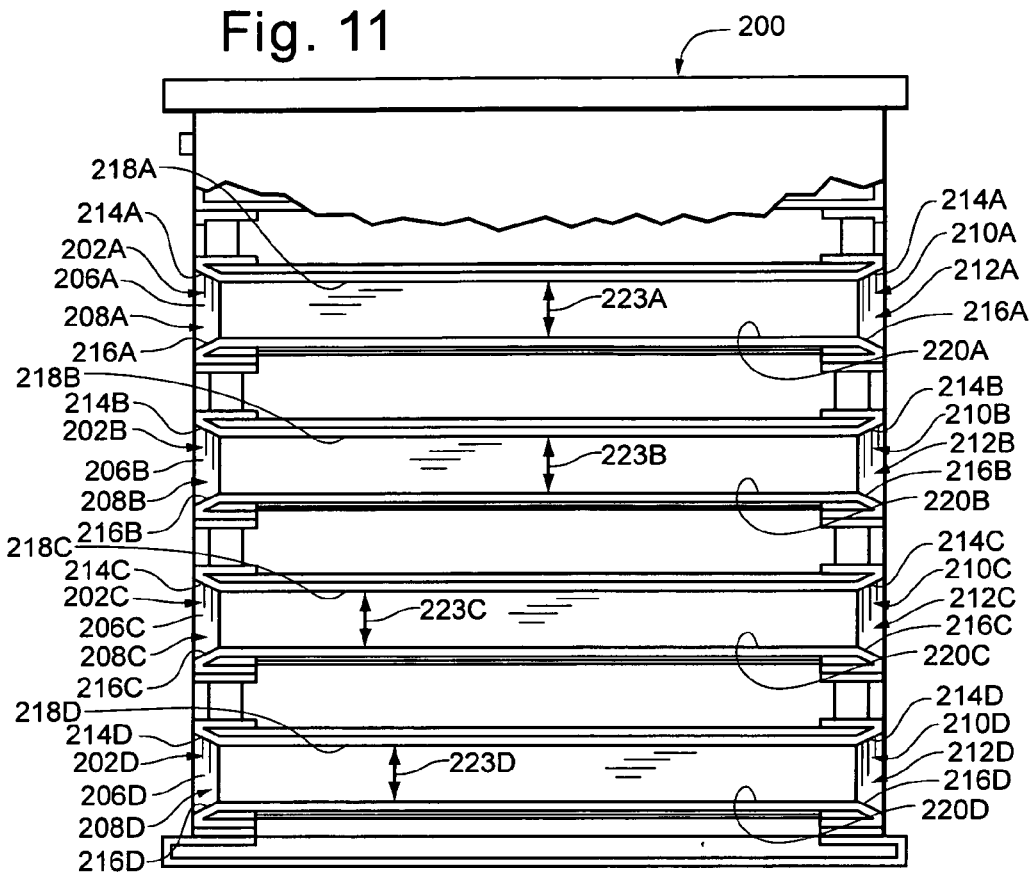
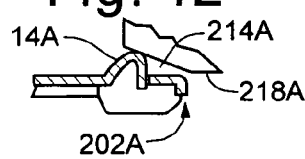
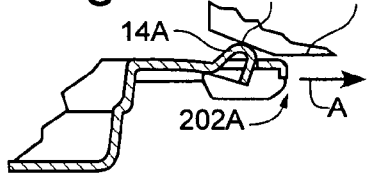
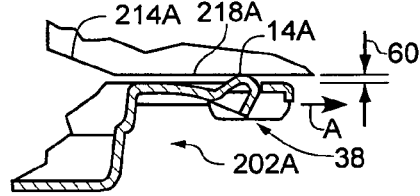
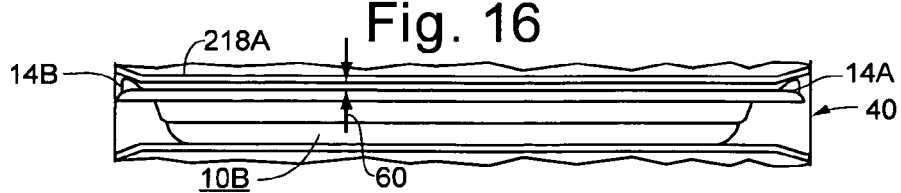

FOOD TRAY

FIELD OF THE INVENTION

This invention relates to a food tray adapted to be removably located in a predetermined position in a food holding compartment that may be used to keep food heated or cooled. The food tray of the present invention is particularly suited for use in, for example, heated compartments used in quick service restaurants to store cooked food product, for example.

BACKGROUND OF THE INVENTION

Quick service restaurants face a number of conflicting factors when striving to efficiently provide fast, palatable, and safe food. First, the customers expect to receive their food quickly, with a minimum of delay and with predictable and constant high quality. Moreover, the rate of customer demand varies over time, with some periods, such as lunch and dinner times, having extremely high rates of customer demand. However, the kitchens of many quick service restaurants are of limited size and/or production capacity and thus necessarily have a limited number of food cooking devices.

To meet the often competing factors of quick service and consistent high quality, it is advantageous for one individual to cook a relatively substantial amount of food product in bulk and store the cooked food product in food trays while another individual food preparer transfers food from the trays to a sandwich bun or individual portion sized container, for example, to fill customer orders. Typical food products that are of most interest to have readily available for food preparers include sandwich fillings such as hamburger patties, breaded fish fillets, Canadian bacon, pork sausage, eggs, and breaded chicken patties, for example, as well as other products, such as chicken nuggets, biscuits, muffins, and hotcakes.

Because these prepared food products are not being served immediately upon preparation, it is critical to store the food product so as to optimally maintain the appearance, taste, temperature and texture of the food product, as well as minimize bacterial contamination of the stored food product.

A need exists for an improved food tray and a method of using the food tray that optimizes, without any significant adverse effects, the appearance, taste, temperature and texture of the pre-cooked bulk food products, as well as minimize bacterial contamination of such stored food products. In addition, a need also exists for a food staging device that promotes efficient food handling and use of space within the kitchen of the quick service restaurant.

SUMMARY OF THE INVENTION

In accordance with the present invention, an improved food tray and method for use in connection with a compartment, and preferably in a heated pass-through compartment, for holding ready-to-serve food product is provided. When used in combination with a compartment of desirable configuration, the food tray is particularly useful for storing over an extended period of time cooked sandwich fillings such as, for example, hamburger patties, fish fillets, Canadian bacon, pork sausage, eggs, and chicken patties, chicken fillets as well as other types of food, including chicken nuggets, biscuits, muffins, and hotcakes. The appearance, taste, temperature and texture of the stored food items may be maintained over extended storage periods while also minimizing risk of bacterial contamination.

In one aspect of the invention, a food tray is provided which is adapted to be removably located in a predetermined position within a compartment. The food tray includes a tray body and a movable stop member. The tray body includes a first end, second end, a bottom, and a sidewall structure. The bottom and sidewall structure define a volume or cavity for the food tray within which food product can be stored. A stop member is located at one end of the tray body and is movable between a retracted position and an extended position. The stop member is adapted to engage a portion of a compartment when the tray is inserted into the compartment in the predetermined position to restrain further insertion of the tray into the compartment. The predetermined position is preferably the position wherein the food tray is fully inserted within the compartment and wherein further insertion of the tray is restrained unless the user applies a force on the tray in excess of a threshold force which moves the movable stop member from an extended position to a substantially retracted position. Preferably, the stop member has an upturned portion comprising the stop member and has an inclined portion oriented to face the tray body. Preferably, the stop member has a home position in which the stop member is in an extended position.

In accordance with another aspect of the invention, the tray body may include a longitudinal extent at one end of the tray body wherein at least a portion of the longitudinal extent includes a stop member and also defines a handle. Preferably, the longitudinal extent includes a depressed peripheral portion which defines a gripping portion on the longitudinal extent.

In accordance with yet another aspect of the present invention, the tray body includes an integrally formed longitudinal extent with the tray body which includes a stop member. Preferably, the food tray is formed from plastic, but alternatively may be formed from any other "food safe" material.

In accordance with still another aspect of the present invention, the food tray includes a first longitudinal extent at one end of the tray and a second longitudinal extent depending from the opposite of the tray. In a preferred embodiment, the first and second longitudinal extents are each generally horizontally disposed on the food tray. In another embodiment, each of the first and second longitudinal extents is generally vertically disposed on the food tray. Both longitudinal extents are preferably integrally formed with the tray body from plastic or any other suitable "food safe" material.

Additionally, each of the first and second longitudinal extents preferably has located therein a stop member which is also preferably integrally formed with the longitudinal extent. Each stop member may be independently depressed from the other of the movable stop members to permit passage of the food tray through a pass-through compartment.

In accordance with another aspect of the invention, each movable stop member comprises a spring-loaded tab. Typically, each spring tab is defined by a suitable void, which may be a U-shaped void in the portion of the longitudinal extent adjacent the stop member and includes an upturned portion comprising the movable stop member. The void enables the spring tab to be depressed and thereafter return to its original position. Accordingly, each spring tab may move from an extended or home position to a retracted position and thereafter return to the extended or home position. Preferably, each spring tab is also integrally formed with the longitudinal extent in which it is located and may be integrally formed with the longitudinal extent from plastic or any other suitable "food safe" material. A spring tab could also be composed of a mechanism attached to the tray.

In accordance with another aspect of the present invention, a method of storing food, preferably cooked food, within a food tray to be contained in a pass-through compartment is provided. Preferably, the pass-through compartment is a heated compartment having a passageway which extends from an opening on one end of the heated compartment to an opening on an opposite end of the heated compartment. In one embodiment, each of the compartment's openings includes a pair of opposed angled portions to facilitate entry of the tray body into the compartment. However, it is to be understood that such angled portions are not necessary and that the structure of the movable stop member(s) of the food tray can be such that the stop member can move from an extended position to a retracted position even when being inserted into a compartment having an opening which is substantially planar, as in a rectangular-shaped opening.

In one aspect of the method of the present invention, the method includes:

providing a tray having a tray body having a first end and a second end, a bottom and a sidewall structure defining a volume within the tray body, a movable stop member movable between retracted and extended positions located at one end of the tray body and adapted to engage a portion of a compartment when the tray is inserted in the compartment in the predetermined position to restrain further insertion of the tray into the compartment, wherein a height of the walls of the tray body exclusive of the stop member is less than the height of the passageway of the compartment;

at least partially filling the cavity of the food tray with food;

moving the stop member to a retracted position and inserting said food tray into said compartment until the retracted stop member exits the compartment and moves to an extended position to locate the food tray such that the food tray is substantially contained within the compartment.

In accordance with another aspect of the method of the present invention, the food tray includes a movable stop member on each of the two opposed ends of the food tray which are movable between the extended and the retracted positions. When the food tray includes two movable stop members on opposed ends of the food tray, the predetermined operative position of the food tray relative to the compartment is preferably defined by each stop member being located adjacent a respective end of the pass-through compartment. Once in the predetermined operative position, the tray is restrained from movement out of the predetermined operative position without application of a force acting on the tray in excess of a threshold force acting on one of the stop members.

In accordance with still another aspect of the method of the present invention, the method further includes moving one of the stop members to a retracted position at one end of the food tray by pulling the food tray out of the compartment in a direction to cause one stop member to move to the retracted position and pass through at least a portion of the compartment.

In accordance with yet another aspect of the present invention, the method includes inserting one end of the food tray into the pass-through compartment to cause the stop member located at the inserted end of the food tray to be moved to the retracted position. Preferably, the method includes thereafter passing one end of the food tray through the compartment until the stop member of the inserted end travels through the compartment and out the other end of the compartment and moves from the retracted position to the extended position when the stop member exits the compartment.

In a preferred embodiment, the movable stop member has an inclined portion facing the tray body to facilitate movement of the stop member to the retracted position when inserting one end of the tray into the pass-through compartment. In particular, the inclined portion may be forced against a member that is stationary relative to the compartment to cause the stop member to be moved to the retracted position and to permit the portion of the tray having the stop member thereon to travel through the compartment.

There is also provided a method of making a food tray having a movable stop member in accordance with the present invention. The method includes:

forming a food tray body and a longitudinal extent at one end of the food tray body;

forming a void area on three sides of a spring tab area of said longitudinal extent; and forming an upturned portion in the spring tab area of said longitudinal extent to define said stop member.

Other advantages and features of the invention will become apparent from the following description and from reference to the drawings.

BRIEF DESCRIPTION OF THE DRAWINGS

FIG. 1 is a perspective view illustrating a food tray in accordance with the present invention;

FIG. 2 is a fragmentary top plan view of the food tray along line 6-6 of FIG. 1;

FIG. 3 is a fragmentary side elevation view of the food tray of FIG. 2;

FIG. 4 is a fragmentary side elevation view of the food tray along line 4-4 of FIG. 2;

FIG. 5 is a fragmentary elevation view of the food tray along line 5-5 of FIG. 2;

FIG. 6 is a sectional front elevation view of the food tray along line 6-6 of FIG. 1;

FIG. 7 is a fragmentary sectional view along line 7-7 of FIG. 2 showing a depressed peripheral area defining a gripping portion on the food tray in accordance with the present invention;

FIG. 8 is a fragmentary top plan view along line 6-6 of FIG. 1;

FIG. 9 is a fragmentary side sectional view along line 7-7 of FIG. 2 showing a finger engaging the gripping portion of the handle of the food tray;

FIG. 10 is a fragmentary perspective view of a food staging device having a plurality of pass-through compartments and a plurality of food trays located therein in accordance with the present invention;

FIG. 11 is a cut-away side elevation view of the food staging device of FIG. 10 having a plurality of heated pass-through compartments;

FIG. 12 is a fragmentary sectional view of the food tray along line 4-4 of FIG. 2 showing a stop member entering an opening of a pass-through compartment in accordance with the invention;

FIG. 13 is a fragmentary sectional view of the stop member of FIG. 12 moving from an extended position to a retracted position as the food tray is inserted within the pass-through compartment;

FIG. 14 is a fragmentary sectional view of the stop member of FIG. 12 moving into its predetermined operative position within the pass-through compartment;

FIG. 15 is a cut-away side elevation view of a food tray moving into its predetermined position within a pass-through compartment in accordance with the present invention;

FIG. 16 is a cut-away side elevation view of the food tray of FIG. 15 in its predetermined operative position defined by each stop member of the food tray being located adjacent a respective end of the compartment;

DETAILED DESCRIPTION

Figure 17:
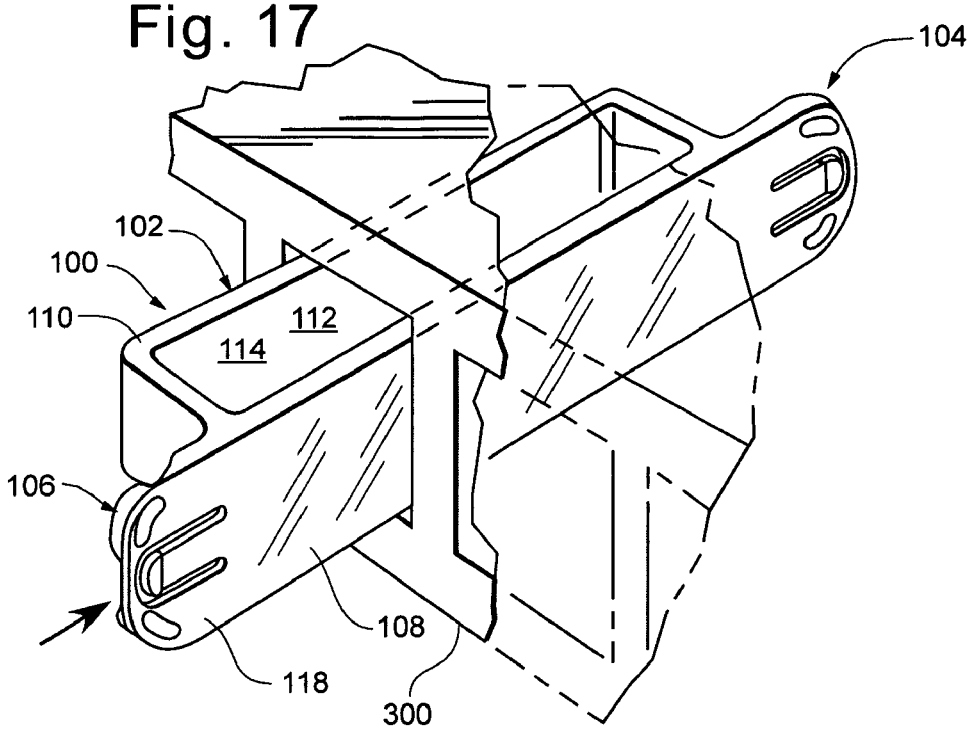
FIG. 17 is a fragmentary, perspective view of another embodiment of a food tray in accordance with the present invention having a generally vertically disposed longitudinal extent and stop member.

While this invention is susceptible of embodiment in many different forms, there is shown in the drawings and described in detail herein, several specific embodiments with the understanding that the present disclosure is to be considered as exemplifications of the principles of the invention and is not intended to limit the invention to the embodiments illustrated.

Referring to the figures generally and in particular to FIG. 1, a food tray 10 according to the present invention is shown generally as having a tray body 12 and movable stop members 14A,B. Tray body 12 includes a first end 16, a second end 18, a bottom 20, and a sidewall structure 22. Bottom 20 and sidewall structure 22 define a volume 24 within tray body 12 within which food items can be stored. First end 16, second end 18, bottom 20, sidewall structure 22, and movable stop members 14 are all preferably integrally formed from plastic, but alternatively may be formed from any other suitable "food safe" material.

Typically, tray body 12 also includes a first longitudinal extent 26 depending from first end 16 which defines a handle 28A for tray body 12 and a second longitudinal extent 30 depending from second end 18. Second longitudinal extent 30 may also define a handle 28B for tray body 12. Preferably, first longitudinal extent 26 and second longitudinal extent 30 are each generally horizontally disposed on tray body 12 such that food tray 10 can be easily maneuvered in and out of a compartment having substantially planar upper and bottom surfaces as will be discussed in detail below. Additionally, food tray 10 typically includes a lip 31 which extends substantially around the entire periphery of tray body 12, including first longitudinal extent 26 and second longitudinal extent 30.

As shown in FIGS. 7-9, handle 28 preferably includes a depressed peripheral area 32 which defines a gripping portion 34 for food tray 10. As shown in FIG. 2, handle 28A preferably includes two depressed areas 32A-B which defines gripping portions 34A-B. FIG. 9 particularly shows gripping portion 34 of depressed peripheral area 32 engaged by the finger of a user.

As shown in FIG. 1, food tray 10 includes at least one movable stop member, and preferably includes two movable stop members 14 A,B: a first movable stop member 14A located on first longitudinal extent 26 of tray body 12 and second movable stop member 14B located on second longitudinal extent 30 of tray body 12. Each stop member 14A,B is movable between an original, extended or home position 36, as shown in FIGS. 3-5, and a retracted position 38, as shown in FIG. 14. Stop members 14A,B are adapted to engage a portion of a compartment, and preferably an upper portion of the compartment, when food tray 12 is inserted into the compartment in a predetermined position 40 to restrain further insertion of food tray 10 into a compartment.

Predetermined position 40 is preferably the position wherein food tray 10 is fully inserted within a compartment as shown in FIGS. 15-16, and wherein further insertion of food tray 10 is restrained unless the user applies a force on tray 10 in excess of a threshold force which would move one of stop members 14A,B from extended position 36, as shown in FIGS. 3-5, to a substantially retracted position 38, as shown in FIG. 14. Further, when food tray 10 is in its predetermined position, volume 24 of food tray 10 is substantially contained within the compartment such that the texture, taste, and temperature of the stored food items are maintained.

As exemplified by stop member 14A illustrated in FIGS. 3-5, each movable stop member 14A,B preferably includes an upturned portion 42 which defines the movable stop member. Upturned portion 42 includes an inclined portion 44 which faces volume 24 of tray body 12, a radiused top edge 46, and a substantially vertical rear portion 48. As such, movable stop member 14A can easily be depressed from an extended position 36 to a retracted position 38 and thereafter return to extended position 36 when abutted against a fixed surface 37. Preferably, movable stop members 14A,B are integrally formed with tray body 12 from plastic or any other suitable "food safe" material. As shown in FIGS. 5-6, upturned portion 42 of stop members 14A,B extends vertically above longitudinal extents 26 and 30 of food tray 10.

As shown in FIGS. 2 and 8, in a preferred embodiment of food tray 10, each movable stop member 14A,B comprises a spring tab 50 wherein each spring tab 50 is movable from extended position 36 to retracted position 38 and back to extended position 36. Preferably, each spring tab 50 is defined by a U-shaped void 52, as shown in FIGS. 2 and 8, in the particular one of longitudinal extents 26, 30 on which spring tab 50 is located. In FIGS. 2 and 8, spring tab 50 is located on first longitudinal extent 26, for example. U-shaped void 52 enables movable stop member 14A, for example, to be moved from extended position 36, as shown in FIGS. 3-5, to retracted position 38, as shown in FIG. 14, when depressed. Alternatively, movable stop members 14A,B may include any other structure which enables the movable stop members to move from an extended position to a retracted position and return to the extended position.

Figure 18:
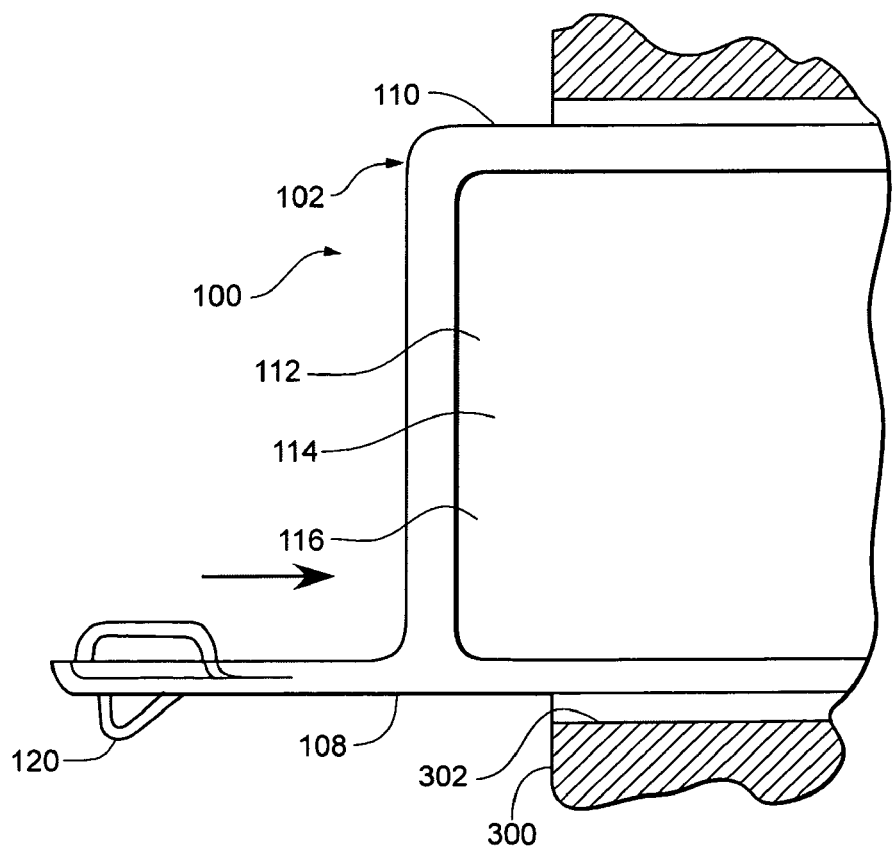
FIG. 18 is a fragmentary top plan view of the food tray of FIG. 17 located within a pass-through compartment.

Another embodiment of a food tray 100 in accordance with the present invention is shown in FIGS. 17-18. Food tray 100 includes a tray body 102 having a first end 104, a second end 106, first side wall 108, and second side wall 110 which collectively define a volume 112 for tray body 102. Volume 112 comprises an opening 114 in top portion 116 of food tray 100. In this embodiment, either or both of first side wall 108 and second side wall 110 include a first longitudinal extent 118, preferably integrally formed therewith.

FIGS. 17-18 illustrate first longitudinal extent 118 depending from first side wall 108 such that longitudinal extent 118 is generally vertically disposed on tray body 102. Preferably, food tray 100 includes a first and a second longitudinal extent, each having a movable stop member disposed thereon. Further, longitudinal extent 118 includes a movable stop member 120, preferably also integrally formed therewith. To enable stop member 120 to engage a portion of a compartment when inserted therein to locate food tray 100 in its predetermined position, stop member 120 extends outward beyond first side wall 108 of food tray 100. Thus, in this embodiment, food tray 100 typically does not include a lip which extends around a perimeter of food tray 100 as described above. Stop member 120 is movable between a home or extended position and a retracted position as described with respect to stop members 14A,B, except that stop member 120 is vertically oriented.

In accordance with the present invention, there is also provided a method of storing food within a food tray to be contained in a pass-through compartment. The method promotes freshness of the food product by ensuring the stored food product has minimal exposure to ambient air. Moreover, the method promotes efficiency in restaurant settings by enabling individual workers charged with the task of providing food items to the food tray and workers charged with the task of removing the stored food items to fill customer orders equally beneficial access to the stored food product.

As shown in FIGS. 10-11, a food staging device 200 having a plurality of heated compartments 202A-D is provided for storing at least one, and preferably a plurality of food trays 10A-C in accordance with the present invention. Each of compartments 202A-D is preferably heated and each of compartments 202 A-D preferably include a passageway 204A-D which extends from a first opening 206A-D on a first end 208A-D of each compartment 202A-D to a second opening 210A-D on the opposite second end 212A-D of each compartment 202A-D. In one embodiment, each of the openings 206A-D and 210A-D of heated compartments 202A-D include a pair of opposed angled portions 214A-D and 216A-D to facilitate entry of any one of food trays 10A-C therein. Reference is made to U.S. Pat. Nos. 6,119,587, 6,209, 447 and 6,607,766 for a more complete description of the general construction and operation thereof.

Each of compartments 202 A-D is bounded by an upper heated compartment surface 218A-D and a lower heated compartment surface 220A-D, as shown in FIG. 11. Upper heated compartment surfaces 218A-D and lower compartment surfaces 220A-D are preferably constructed from a material having a high thermal conductivity and preferably are constructed from anodized aluminum. Moreover, each of upper heated compartment surfaces 218A-D and lower heated compartment surfaces 220A-D are substantially flat and substantially horizontal to provide uniform heat transfer to any one of food trays 10A-C stored therein and to enable easy sliding of any one of trays 10A-C along the surface of lower heated compartment surfaces 220A-D.

Each compartment 202A-D may contain one or more food trays 10A-C in predetermined operative position 40 such that trays 10A-C optimally store food product, and preferably cooked food product. Each of food trays 10A-C has a height 54 defined by the distance between top surface 56 of lip 31 and a lower edge 58 of sidewall structure 22. For each food tray 10A-C, height 54 is less than a height 223A-D of compartment 202 A-D into which trays 10A-C are to be inserted. In other words, height 54 of each tray 10A-C is chosen so that height 54, which does not take into account height of movable stop members 14A,B, is at a predetermined distance 60 from upper compartment surfaces 218 A-D when trays 10A-C are placed within any one of compartments 202A-D so that vapor transfer out of the volume 24 of trays 10A-C is minimized, thereby also minimizing the fluid loss of the cooked food portions in trays 10A-C. Such minimization of fluid loss is critical for cooked food stored in trays 10A-C, such as egg products, hamburger patties, grilled chicken, pork sausage and Canadian bacon to maintain the appearance, texture, temperature, and taste thereof.

The method of storing food within one of food trays 10A-C within a pass-through compartment 202A-D includes initially filling volume 24 of one of food trays 10A-C with food, and preferably cooked food, such as hamburger patties, fish fillets, biscuits, Canadian bacon, pork sausage, eggs, chicken patties, chicken nuggets, to be stored over extended periods of time. When food is stored within one of trays 10A-C, one or more workers charged with providing food items to be stored in food trays 10A-C may have access to food trays 10A-C on a first side 222 of food staging device 200, as shown in FIG. 10, while one or more workers charged with removing food items from trays 10A-C to fill customer orders may be located on a second side 224 of food staging device 200. Moreover, each individual on first side 222 or second side 224 of food staging device 200 is able to selectively pull any one of trays 10A-C out and away from compartments 202A-D and reinsert the selected tray into its predetermined position 40 where food within the selected tray is optimally stored.

Once any one of food trays 10A-C is filled with the desired food items, the user may insert food trays 10A-C into any one of compartments 202A-D. In one embodiment, as is also shown in FIG. 11, each of openings 206 A-D and 210 A-D of the heated compartments 202 A-D includes a pair of opposed angled portions 214 A-D and 216 A-D to facilitate entry of a food tray 10 therein. It is understood, however, that although movable stop members 14A,B will extend vertically above the vertical plane of longitudinal extents 26 and 30 as shown in FIGS. 3-6, each of the compartments' openings 206A-D and 210A-D need not have an angled opening to enable any one of food trays 10A-C to be inserted within any one of compartments 202 A-D. Openings 206 A-D and 210 A-D may in fact be substantially planar because movable stop members 14A,B are designed such that upturned portion 42, including radiused top edge 46, may be moved from extended position 36 to retracted position 38 when stop member 14 is forced against a member that is stationary relative to any one of compartments 202 A-D, such as relatively planar upper heated compartment surfaces 218 A-D of compartments 202 A-D.

When in retracted position 38, the portion of food tray 10A-C having one of stop members 14A,B thereon may travel through a selected one of compartments 202 A-D as exemplified by tray 10A entering compartment 202A in FIGS. 12-14. In particular, FIG. 12 illustrates stop member 14A in its extended position 36 entering first end 208A of compartment 202A having angled portions 214A. FIG. 13 illustrates stop member 14A beginning to move from extended position 36 to retracted position 38 as tray 10A is traveling through into compartment 202A. Further, FIG. 14 illustrates stop member 14A in retracted position 38 now traveling within compartment 202A having an upper heated compartment surface 218A where stop member 14A is in sufficient contact with upper heated compartment surface 218A such that stop member 14A is depressed to retracted position 38 and can travel through compartment 202A in retracted position 38.

As shown in FIG. 15, the user may continue to move food tray 10A through compartment 202A in the direction of arrow A until stop member 14A in retracted position 38 exits the compartment on second end 212A. As the food tray 10 begins to exit out opening 210A on second end 212A, stop member 14A begins to move from retracted position 38 to extended position 36. On the inserted first end 208A of food tray 10, the opposed stop member 14B from stop member 14A engages angled portions 214A of opening 206A.

When stop member 14A substantially exits second opening 210A and stop member 14A is substantially in extended position 36, stop member 14A is located adjacent second end 212A of compartment 202A and stop member 14B is located adjacent first end 208A of compartment 202A as shown in FIGS. 15-16. Thus, food tray 10A is substantially contained within compartment 202A. When each stop member 14A,B is substantially in its extended position 36 and each stop member 14A,B is located adjacent a relative end 208A and 212A of compartment 202A, food tray 10A is in its predetermined operative position 40 in compartment 202A. Predetermined operative position 40 is defined by each stop member 14A,B being located adjacent a respective opening 206A-D and 210A-D of compartment 202 A-D. In its predetermined operative position 40, food tray 10A is restrained from movement out of predetermined operative position 40 in compartment 202A without application of a force acting on the tray 10A in excess of a threshold force acting on one of the stop members 14A,B which would move one of the stop members 14A,B from extended position 36 to retracted position 38. Moreover, in predetermined operative position 40, volume 24 of food tray 10A is substantially covered by upper compartment surface 218A and substantially no part of volume 24 is exposed to ambient air other than predetermined distance 60 such that the appearance, taste, temperature, and texture of food contained within volume 24 is maintained.

Subsequently, an individual on second side 224 of food staging device 200 may pull first end 16 of food tray 10A out and away from compartment 202A to access the previously stored food product in food tray 10A. Preferably, food tray 10A is pulled out and away from compartment 202A by gripping depressed peripheral area 32 on first end 16 of food tray 10A. When first end 16 of food tray 10A is pulled out and away from compartment 202A, stop member 14B on second end 18 of food tray 10A is moved from extended position 36 to retracted position 38 and may pass through compartment 202A. Thereafter, when the sandwich preparer, for example, is finished removing the food product from food tray 10A, tray 10A may be pushed inward into compartment 202A to its predetermined operative position 40 where stop member 14A is located adjacent second end 212A of compartment 202A and stop member 14B is located adjacent first end 208A of compartment 202A, as shown in FIGS. 15-16.

In the embodiment discussed previously, wherein food tray 100 includes a stop member 120 and a longitudinal extent 118 which are substantially vertically disposed as shown in FIGS. 17-18, stop member 120 is located in its predetermined position within a compartment 300 by inserting food tray 100 until stop member 120 is located adjacent and engages a side wall 302 of compartment 300.

While the invention has been described with respect to certain preferred embodiments, it is to be understood that the invention is capable of numerous changes, modifications, and rearrangements without departing from the scope or spirit of the invention as defined in the claims.

We claim:

1. A food tray adapted to be removably located in a predetermined and restrained position in a compartment,
   said compartment defining a predetermined pass-through space for the food tray to be located in the predetermined and restrained position, the pass-through space being substantially covered by the compartment from above and below and having first and second open ends spaced apart to define a longitudinal dimension of the pass-through space, and the compartment including a stop member engaging portion proximate to each end of the pass-through space, the stop member engaging portions being substantially immovable with respect to the compartment, said food tray comprising,
   a tray body having a first end and a second end spaced apart to define a longitudinal dimension of the tray body, a bottom and a sidewall structure defining a tray volume within said tray body, said tray volume having a length generally aligned with the longitudinal dimension with the tray body;
   a first longitudinal extension extending from said first end of said tray body in a generally longitudinal direction away from said tray volume;
   a first movable stop member located in the first longitudinal extension;
   a second movable stop member located proximate to the second end of said tray body;
   a first generally longitudinal direction being the direction when the first stop member enters the pass-through space before the second stop member, and a second generally longitudinal direction being the direction when the second stop member enters the pass-through space before the first stop member,
   each of the first and second stop members having first and second deflectable surfaces that are generally opposed to each other, each of said first and second deflectable surfaces including a sloped compartment engaging portion, said first deflectable surface of said first stop member facing in the first longitudinal direction and the first deflectable surface of the second stop member generally facing in the second longitudinal direction, and the second deflectable surface of the first stop member generally facing in the second generally longitudinal direction, said first deflectable surface of said first stop member is movable between a deflected position and an extended position and adapted to engage a portion of the compartment when in the extended position, to partially restrain insertion of the tray into the compartment in the first generally longitudinal direction, and said second deflectable surface of said first stop member movable between a deflected position and an extended position and adapted to engage a portion of the compartment when in the extended position, to partially restrain insertion of the tray into the compartment in the second generally longitudinal direction, said second deflectable surface of the second stop member is adapted to partially restrain further insertion of the tray into the compartment in the generally first longitudinal direction in which the deflectable surface faces, when the tray is inserted in the compartment in the predetermined and restrained position, said second deflectable surface of said first stop member is adapted to partially restrain movement of the tray into the compartment in the second generally longitudinal direction,
   so that the tray is movable through the pass-through space in either generally longitudinal direction by the mere application of a longitudinal force on the tray sufficient to cause the first or second stop member engaged to the stop member engaging portion of the compartment, to deflect transversely clear of the engaged portion of the compartment;
   the sloped compartment engaging portions of said deflectable surfaces of said first and second stop members being located beyond the length of the tray volume, and when said deflectable surfaces are in their extended positions, the sloped compartment engaging portions being located beyond a transverse dimension of the tray sidewall structure.

2. The food tray of claim 1 wherein at least a portion of said first longitudinal extension defines a handle for said food tray.

3. The food tray of claim 2 further comprising a second longitudinal extension depending from said second end of the tray body.

4. The food tray of claim 3 wherein said second stop member is located in said second longitudinal extension.

5. The food tray of claim 1 wherein said first and second stop members comprise first and second spring-loaded tabs, respectively.

6. The food tray of claim 1 wherein each one of said stop members may be independently depressed from said other stop member to permit passage of said tray through a pass-through compartment.

7. The food tray of claim 2 wherein said first stop member comprises a spring loaded tab integrally formed in said first longitudinal extension.

8. The food tray of claim 1 wherein said stop members include an upturned portion.

9. The food tray of claim 5 wherein said first spring-loaded tab is defined by a U-shaped void in the first longitudinal extension at said first end of said tray body, wherein at least a portion of said first longitudinal extension defines a handle for said food tray.

10. The food tray of claim 3 wherein said first and second longitudinal extensions are disposed generally parallel to said bottom of said tray body.

11. The food tray of claim 3 wherein said first and second longitudinal extensions are disposed generally orthogonal to said bottom of said tray body.

12. The food tray of claim 2 further comprising a depressed peripheral area defining a gripping portion on said longitudinal extension.

13. The food tray of claim 1,
the sloped compartment engaging portions of said deflectable surfaces of said first and second stop members being located beyond a vertical dimension of the tray sidewall structure when said deflectable surfaces are in their extended positions.

14. A method of storing food within a food tray in a predetermined and restrained position in a pass-through compartment comprising:
at least partially filling the food tray as recited in claim 1 with food;
placing the at least partially filled food tray into the pass-through compartment recited in claim 1, by moving said first stop member from the extended position to the retracted position by inserting said food tray into said compartment and continuing to insert the tray through the compartment until said second stop member in the extended position engages the portion of the compartment proximate to the first end of the pass-through space, where said pass-through compartment defines a predetermined pass-through space for the food tray to be located in the predetermined and restrained position, the pass-through space being substantially covered by the compartment from above and below and having first and second open ends spaced apart to define a longitudinal dimension of the pass-through space; and
locating said food tray in the predetermined and restrained position such that said tray volume is substantially contained within aid compartment.

15. The method of claim 14 wherein the food is cooked food and the compartment is heated.

16. The method of claim 14 further comprising moving one of said stop members to a retracted position at one of said ends by pulling said food tray out of said compartment in a generally longitudinal direction to cause said one stop member to move to said retracted position and pass through at least a portion of said compartment and thereafter removing food from the tray.

17. The method of claim 14 wherein said first movable stop member has an inclined portion facing the tray body and the method further comprises forcing the inclined portion against a member that is stationary relative to the compartment causing said first stop member to be moved to a retracted position permitting the portion of the tray having said first stop member thereon to travel through said compartment.

18. The method of claim 14 wherein said inserting of the food tray into a pass-through compartment causes the stop member located at an inserted end of the tray to be moved to the retracted position.

19. The method of claim 18 further comprising passing said inserted end of said food tray through the compartment until the stop member at the inserted end travels into one end of the compartment, through the compartment and out the other end of the compartment, the stop member moving from a retracted position to an extended position when said stop member exits the compartment.

20. The method of claim 19 further comprising locating said food tray in the predetermined position, wherein the predetermined position is defined by each stop member being located adjacent a respective end of the compartment.

21. The method of claim 20 further comprising restraining said tray from movement out of said predetermined operative position in said compartment when a force less than a threshold force has been applied to one of said stop members.

* * * * *

UNITED STATES PATENT AND TRADEMARK OFFICE
CERTIFICATE OF CORRECTION

| | | |
|---|---|---|
| PATENT NO. | : 7,901,723 B2 | Page 1 of 1 |
| APPLICATION NO. | : 10/930174 | |
| DATED | : March 8, 2011 | |
| INVENTOR(S) | : Manuel Calzada, James C. Purgatorio and Michael Theodos | |

It is certified that error appears in the above-identified patent and that said Letters Patent is hereby corrected as shown below:

Column 12, line 3, claim 14 "aid" should be changed to --said--.

Signed and Sealed this
Fifth Day of July, 2011

David J. Kappos
*Director of the United States Patent and Trademark Office*